A. F. ENGLERTH.
BALL BEARING.
APPLICATION FILED JAN. 2, 1917.

Patented Mar. 27, 1917.

Witness:

Inventor:
Anton F. Englerth,
By Charles Turner Brown,
Atty.

UNITED STATES PATENT OFFICE.

ANTON F. ENGLERTH, OF CHICAGO, ILLINOIS.

BALL-BEARING.

1,220,616. Specification of Letters Patent. Patented Mar. 27, 1917.

Application filed January 2, 1917. Serial No. 140,076.

*To all whom it may concern:*

Be it known that I, ANTON F. ENGLERTH, a subject to the King of Hungary, and a resident of Chicago, in the county of Cook and State of Illinois, have invented certain new and useful Improvements in Ball-Bearings, of which the following is a specification.

This invention relates to a ball bearing adapted to be used in mill work on shaftings, in vehicles, on automobiles, and in other places.

This device is of the kind which comprises an inner and an outer ring, the inner face of the outer ring, and the outer face of the inner ring being, respectively, provided with raceways, with balls in said raceways, and retainers or separators interposed between said balls.

The object of the invention is to obtain a ball bearing wherein, whether a single or double row of balls may be used, the greatest possible number of balls for a bearing which is provided with means for preventing one ball from coming in contact with an adjacent ball may be inserted, to travel on the several raceways of the bearing.

A further object is to obtain a ball bearing of the kind named in which the balls and separators combined will entirely fill the raceways; that is, neither of said members will be free from contact with the adjacent members, while at the same time there will be substantially no friction between them.

A further object is to obtain a ball bearing of the kind named which is economical in construction, durable and not liable to get out of order.

Additional objects are set forth in the description and claims.

In the drawing forming a part of this specification;

Figure 1:
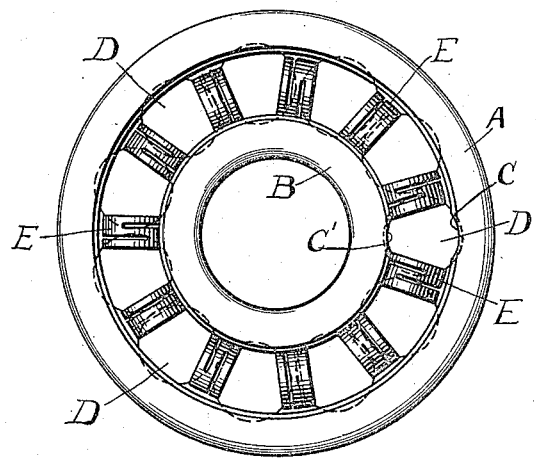
Figure 1 is an elevation of a bearing embodying the invention.
Figure 2:
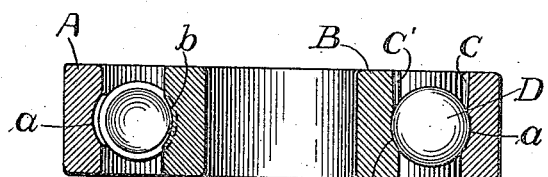
Fig. 2 is a sectional view of the bearing.
Figure 3:
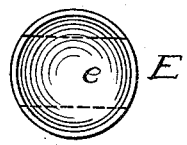
Fig. 3 is an end view of one of the separators of the bearing.

A reference character applied to designate a given part indicates said part throughout the several figures of the drawing wherever the same appears.

A represents the outer ring of the bearing, B the inner ring.

$a$, and $b$, respectively indicate the raceways in said rings.

C, C' represent transverse recesses which are at right angles to the raceways $a$, $b$, and extend therefrom to the end walls of the rings.

The bottoms of the recesses C, C' are slightly above the bottoms of the raceways $a$, $b$, and hence, while balls D may be inserted through said recess into said raceways, when the rings are arranged so that said recesses are oppositely placed, after said balls are in said raceways they will not leave the raceways, to escape therefrom, by way of said recesses.

The separators of the bearing consist of the members E, which are respectively provided with recesses in the ends thereof which fit onto the balls D, and with the cuts F, F.

The cuts F, F, make, so far as operation is concerned, a spring separator of said members E, having the end parts $e$, $e$, with recesses fitting the balls and the central spring part $e'$.

Figure 4:
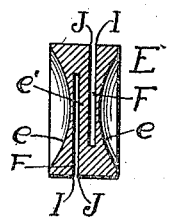
Fig. 4 is a section of said separator.

Compression of the separator longitudinally is determined by the width of the cut. That is, the compression can be only enough to force edges I, J, (Fig. 4), into contact.

The diameter of the separators is less than the difference between the outer diameter of the smaller ring and the inner diameter of the larger one.

To assemble the bearing, the ring A is placed outside of ring B with the recesses C, C', opposite each other and balls D with separators E are placed between said rings in the raceways $a$, $b$. Some of said balls, with separators between them, can be put in place in the raceways before using the transverse recess, and the remainder of the balls required are inserted thereinto through said transverse recesses.

I find that the spring part $e'$ of the several separators permits sufficient compression thereof to insure contact between all said separators and all said balls in the bearing, while at the same time no appreciable friction between the balls and separators occurs.

By using a spring separator constructed as described a large number of balls are contained in a given size bearing as the separator does not require adjacent balls to be placed a great distance apart.

I claim:—

1. A ball bearing comprising rings provided with a plurality of raceway on adjacent faces and with transverse channels from the sides of said rings to said raceways, in combination with balls in said raceways and separators mounted on said balls, said separators respectively comprising an integral body provided with transversely extending cuts to obtain end parts and an intermediate spring part, and said end parts respectively provided with a recess fitting said balls.

2. A ball bearing comprising rings provided with raceways on adjacent faces and with transverse channels from the sides of said rings to said raceways, the bottoms of said transverse channels being of less depth than the bottoms of said raceways, in combination with balls in said raceways and separators mounted on said balls, said separators respectively being of less width than the diameter of the balls, and provided with recesses on the ends thereof fitting on to the balls, said separators respectively comprising an integral body provided with transverse parallel cuts extending inwardly from opposite sides, to obtain end parts and an intermediate spring part.

3. In a ball bearing comprising balls and raceways for said balls, separators respectively consisting of an integral member provided with recesses at its ends and provided with parallel cuts from opposite sides thereof arranged to obtain end parts and an intermediate spring part.

ANTON F. ENGLERTH.

In the presence of—
S. JOH. CHRISTENSEN,
GUST MARCEK.

Copies of this patent may be obtained for five cents each, by addressing the "Commissioner of Patents, Washington, D. C."